United States Patent
Lundin et al.

(10) Patent No.: US 9,042,261 B2
(45) Date of Patent: May 26, 2015

(54) METHOD AND DEVICE FOR DETERMINING A JITTER BUFFER LEVEL

(71) Applicant: Google Inc., Mountain View, CA (US)

(72) Inventors: Henrik Fahlberg Lundin, Sollentuna (SE); Stefan Holmer, Stockholm (SE)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 14/174,916

(22) Filed: Feb. 7, 2014

(65) Prior Publication Data

US 2014/0153431 A1 Jun. 5, 2014

Related U.S. Application Data

(63) Continuation of application No. 13/497,625, filed as application No. PCT/EP2010/063818 on Sep. 20, 2010, now Pat. No. 8,665,745.

(60) Provisional application No. 61/245,003, filed on Sep. 23, 2009.

(51) Int. Cl.
*H04L 12/26* (2006.01)
*H04L 12/28* (2006.01)
*H04L 12/861* (2013.01)

(52) U.S. Cl.
CPC .......... *H04L 43/087* (2013.01); *H04L 43/0852* (2013.01); *H04L 43/106* (2013.01); *H04L 49/90* (2013.01); *H04L 49/9005* (2013.01)

(58) Field of Classification Search
None
See application file for complete search history.

(56) References Cited

U.S. PATENT DOCUMENTS

| | | | |
|---|---|---|---|
| 5,432,900 A | 7/1995 | Rhodes et al. | |
| 5,473,326 A | 12/1995 | Harrington et al. | |
| 5,589,945 A | 12/1996 | Abecassis | |
| 5,606,371 A | 2/1997 | Klein Gunnewiek et al. | |
| 5,659,539 A | 8/1997 | Porter et al. | |
| 5,696,869 A | 12/1997 | Abecassis | |

(Continued)

FOREIGN PATENT DOCUMENTS

| | | |
|---|---|---|
| EP | 1947680 | 7/2008 |
| WO | WO9611457 | 4/1996 |

(Continued)

OTHER PUBLICATIONS

Bankoski et al. "Technical Overview of VP8, An Open Source Video Codec for the Web". Dated Jul. 11, 2011.

(Continued)

*Primary Examiner* — Hong Cho
(74) *Attorney, Agent, or Firm* — Young, Basile, Hanlon & MacFarlane, P.C.

(57) ABSTRACT

A buffer level for jitter data buffer is determined. A frame payload size difference is determined for a plurality of video frames encoded into data packets sequentially received from a network. The difference is a difference in a payload size of a current frame and a previous frame. A frame network transit delay is determined as a difference in a transport time between the current frame and the previous frame and an expected transport time between the current frame and the previous frame. A slope and a variance of a linear relationship between the frame payload size difference and the frame network transit delay are determined for the plurality of video frames. Finally, a buffer level of a jitter data buffer is determined using a maximum frame payload size, an average frame payload size, the slope and the variance.

20 Claims, 4 Drawing Sheets

(56) References Cited

U.S. PATENT DOCUMENTS

| | | |
|---|---|---|
| 5,793,647 A | 8/1998 | Hageniers et al. |
| 5,828,370 A | 10/1998 | Moeller et al. |
| 5,903,264 A | 5/1999 | Moeller et al. |
| 5,910,827 A | 6/1999 | Kwan et al. |
| 5,913,038 A | 6/1999 | Griffiths |
| 5,930,493 A | 7/1999 | Ottesen et al. |
| 5,943,065 A | 8/1999 | Yassaie et al. |
| 5,963,203 A | 10/1999 | Goldberg et al. |
| 6,011,824 A | 1/2000 | Oikawa et al. |
| 6,014,706 A | 1/2000 | Cannon et al. |
| 6,047,255 A | 4/2000 | Williamson |
| 6,052,159 A | 4/2000 | Ishii et al. |
| 6,061,821 A | 5/2000 | Schlosser |
| 6,112,234 A | 8/2000 | Leiper |
| 6,119,154 A | 9/2000 | Weaver et al. |
| 6,134,239 A * | 10/2000 | Heinanen et al. ............ 370/412 |
| 6,134,352 A | 10/2000 | Radha et al. |
| 6,185,363 B1 | 2/2001 | Dimitrova et al. |
| 6,253,249 B1 | 6/2001 | Belzile |
| 6,266,337 B1 | 7/2001 | Marco |
| 6,404,817 B1 | 6/2002 | Saha et al. |
| 6,452,950 B1 | 9/2002 | Ohlsson et al. |
| 6,453,283 B1 | 9/2002 | Gigi |
| 6,510,219 B1 | 1/2003 | Wellard et al. |
| 6,512,795 B1 | 1/2003 | Zhang et al. |
| 6,587,985 B1 | 7/2003 | Fukushima et al. |
| 6,590,902 B1 | 7/2003 | Suzuki et al. |
| 6,597,812 B1 | 7/2003 | Fallon et al. |
| 6,636,561 B1 | 10/2003 | Hudson |
| 6,665,317 B1 | 12/2003 | Scott |
| 6,683,889 B1 | 1/2004 | Shaffer et al. |
| 6,684,354 B2 | 1/2004 | Fukushima et al. |
| 6,700,893 B1 | 3/2004 | Radha et al. |
| 6,707,852 B1 | 3/2004 | Wang |
| 6,721,327 B1 | 4/2004 | Ekudden et al. |
| 6,732,313 B2 | 5/2004 | Fukushima et al. |
| 6,747,999 B1 | 6/2004 | Grosberg et al. |
| 6,778,553 B1 | 8/2004 | Chou |
| 6,792,047 B1 | 9/2004 | Bixby et al. |
| 6,859,460 B1 | 2/2005 | Chen |
| 6,885,986 B1 | 4/2005 | Gigi |
| 6,918,077 B2 | 7/2005 | Fukushima et al. |
| 6,934,258 B1 | 8/2005 | Smith et al. |
| 6,996,059 B1 * | 2/2006 | Tonogai ............ 370/230 |
| 7,003,039 B2 | 2/2006 | Zakhor et al. |
| 7,068,710 B2 | 6/2006 | Lobo et al. |
| 7,092,441 B1 | 8/2006 | Hui et al. |
| 7,096,481 B1 | 8/2006 | Forecast et al. |
| 7,124,333 B2 | 10/2006 | Fukushima et al. |
| 7,180,896 B1 | 2/2007 | Okumura |
| 7,180,901 B2 | 2/2007 | Chang et al. |
| 7,263,644 B2 | 8/2007 | Park et al. |
| 7,271,747 B2 | 9/2007 | Baraniuk et al. |
| 7,295,137 B2 | 11/2007 | Liu et al. |
| 7,356,750 B2 | 4/2008 | Fukushima et al. |
| 7,359,324 B1 * | 4/2008 | Ouellette et al. ............ 370/230 |
| 7,372,834 B2 | 5/2008 | Kim et al. |
| 7,376,880 B2 | 5/2008 | Ichiki et al. |
| 7,379,068 B2 | 5/2008 | Radke |
| 7,406,501 B2 | 7/2008 | Szeto et al. |
| 7,447,235 B2 | 11/2008 | Luby et al. |
| 7,447,969 B2 | 11/2008 | Park et al. |
| 7,484,157 B2 | 1/2009 | Park et al. |
| 7,502,818 B2 | 3/2009 | Kohno et al. |
| 7,504,969 B2 | 3/2009 | Patterson et al. |
| 7,636,298 B2 | 12/2009 | Miura et al. |
| 7,653,867 B2 | 1/2010 | Stankovic et al. |
| 7,680,076 B2 | 3/2010 | Michel et al. |
| 7,719,579 B2 | 5/2010 | Fishman et al. |
| 7,733,893 B2 * | 6/2010 | Lundin ............ 370/412 |
| 7,756,127 B2 | 7/2010 | Nagai et al. |
| 7,823,039 B2 | 10/2010 | Park et al. |
| 7,886,071 B2 | 2/2011 | Tomita |
| RE42,272 E | 4/2011 | Zakhor et al. |
| 7,974,243 B2 | 7/2011 | Nagata et al. |
| 8,050,446 B2 | 11/2011 | Kountchev et al. |
| 8,098,957 B2 | 1/2012 | Hwang et al. |
| 8,102,399 B2 | 1/2012 | Berman et al. |
| 8,139,642 B2 | 3/2012 | Vilei et al. |
| 8,326,061 B2 | 12/2012 | Massimino |
| 8,352,737 B2 | 1/2013 | Solis et al. |
| 8,462,654 B1 | 6/2013 | Gieger et al. |
| 8,477,050 B1 | 7/2013 | Massimino |
| 8,526,360 B1 | 9/2013 | Breau et al. |
| 8,542,265 B1 | 9/2013 | Dodd et al. |
| 2002/0034245 A1 | 3/2002 | Sethuraman et al. |
| 2002/0099840 A1 | 7/2002 | Miller et al. |
| 2002/0140851 A1 | 10/2002 | Laksono |
| 2002/0157058 A1 | 10/2002 | Ariel et al. |
| 2002/0159525 A1 | 10/2002 | Jeong |
| 2002/0167911 A1 * | 11/2002 | Hickey ............ 370/252 |
| 2003/0018647 A1 | 1/2003 | Bialkowski |
| 2003/0058943 A1 | 3/2003 | Zakhor et al. |
| 2003/0098992 A1 | 5/2003 | Park et al. |
| 2003/0103681 A1 | 6/2003 | Guleryuz |
| 2003/0193486 A1 | 10/2003 | Estrop |
| 2003/0210338 A1 | 11/2003 | Matsuoka et al. |
| 2003/0226094 A1 | 12/2003 | Fukushima et al. |
| 2004/0017490 A1 | 1/2004 | Lin |
| 2004/0071170 A1 | 4/2004 | Fukuda |
| 2004/0146113 A1 | 7/2004 | Valente |
| 2004/0165585 A1 | 8/2004 | Imura et al. |
| 2005/0024384 A1 | 2/2005 | Evans et al. |
| 2005/0063402 A1 * | 3/2005 | Rosengard et al. ............ 370/412 |
| 2005/0063586 A1 | 3/2005 | Munsil et al. |
| 2005/0104979 A1 | 5/2005 | Fukuoka et al. |
| 2005/0111557 A1 | 5/2005 | Kong et al. |
| 2005/0154965 A1 | 7/2005 | Ichiki et al. |
| 2005/0180415 A1 | 8/2005 | Cheung et al. |
| 2005/0220188 A1 | 10/2005 | Wang |
| 2005/0220444 A1 | 10/2005 | Ohkita et al. |
| 2005/0232290 A1 | 10/2005 | Mathew et al. |
| 2005/0259690 A1 | 11/2005 | Garudadri et al. |
| 2005/0281204 A1 | 12/2005 | Karol et al. |
| 2006/0150055 A1 | 7/2006 | Quinard et al. |
| 2006/0164437 A1 | 7/2006 | Kuno |
| 2006/0200733 A1 | 9/2006 | Stankovic et al. |
| 2006/0256232 A1 | 11/2006 | Noguchi |
| 2006/0268124 A1 | 11/2006 | Fishman et al. |
| 2007/0168824 A1 | 7/2007 | Fukushima et al. |
| 2007/0189164 A1 | 8/2007 | Smith et al. |
| 2007/0230585 A1 | 10/2007 | Kim et al. |
| 2007/0233707 A1 | 10/2007 | Osmond et al. |
| 2007/0255758 A1 | 11/2007 | Zheng et al. |
| 2007/0269115 A1 | 11/2007 | Wang et al. |
| 2008/0005201 A1 | 1/2008 | Ting et al. |
| 2008/0008239 A1 | 1/2008 | Song |
| 2008/0046249 A1 | 2/2008 | Thyssen et al. |
| 2008/0052630 A1 | 2/2008 | Rosenbaum et al. |
| 2008/0055428 A1 | 3/2008 | Safai |
| 2008/0065633 A1 | 3/2008 | Luo et al. |
| 2008/0101403 A1 | 5/2008 | Michel et al. |
| 2008/0123754 A1 | 5/2008 | Ratakonda et al. |
| 2008/0124041 A1 | 5/2008 | Nielsen et al. |
| 2008/0130756 A1 | 6/2008 | Sekiguchi et al. |
| 2008/0170793 A1 | 7/2008 | Yamada et al. |
| 2008/0209300 A1 | 8/2008 | Fukushima et al. |
| 2008/0211931 A1 | 9/2008 | Fujisawa et al. |
| 2008/0225735 A1 | 9/2008 | Qiu et al. |
| 2008/0228735 A1 | 9/2008 | Kenedy et al. |
| 2008/0273591 A1 | 11/2008 | Brooks et al. |
| 2008/0291209 A1 | 11/2008 | Sureka et al. |
| 2009/0007159 A1 | 1/2009 | Rangarajan et al. |
| 2009/0052543 A1 | 2/2009 | Wu et al. |
| 2009/0073168 A1 | 3/2009 | Jiao et al. |
| 2009/0103606 A1 | 4/2009 | Lu et al. |
| 2009/0110055 A1 | 4/2009 | Suneya |
| 2009/0164655 A1 | 6/2009 | Pettersson et al. |
| 2009/0172116 A1 | 7/2009 | Zimmet et al. |
| 2009/0213940 A1 | 8/2009 | Steinbach et al. |
| 2009/0219994 A1 | 9/2009 | Tu et al. |
| 2009/0249158 A1 | 10/2009 | Noh et al. |
| 2009/0254657 A1 | 10/2009 | Melnyk et al. |
| 2009/0271814 A1 | 10/2009 | Bosscha |

(56) References Cited

U.S. PATENT DOCUMENTS

| | | | |
|---|---|---|---|
| 2009/0284650 | A1 | 11/2009 | Yu et al. |
| 2010/0111489 | A1 | 5/2010 | Presler |
| 2010/0150441 | A1 | 6/2010 | Evans et al. |
| 2011/0078532 | A1 | 3/2011 | Vonog et al. |
| 2011/0122036 | A1 | 5/2011 | Leung et al. |
| 2011/0265136 | A1 | 10/2011 | Liwerant et al. |
| 2012/0002080 | A1 | 1/2012 | Sasaki |
| 2012/0252679 | A1 | 10/2012 | Holcomb |
| 2012/0262603 | A1 | 10/2012 | Chen et al. |
| 2012/0314102 | A1 | 12/2012 | Wang |
| 2012/0315008 | A1 | 12/2012 | Dixon et al. |
| 2013/0039410 | A1 | 2/2013 | Tan et al. |
| 2013/0046862 | A1 | 2/2013 | Yang |
| 2013/0182130 | A1 | 7/2013 | Tran |

FOREIGN PATENT DOCUMENTS

| | | |
|---|---|---|
| WO | WO9949664 | 9/1999 |
| WO | WO0233979 | 4/2002 |
| WO | WO02062072 | 8/2002 |
| WO | WO02067590 | 8/2002 |
| WO | WO02078327 | 10/2002 |
| WO | WO03043342 | 5/2003 |

OTHER PUBLICATIONS

Bankoski et al. "VP8 Data Format and Decoding Guide" Independent Submission. RFC 6389, Dated Nov. 2011.
Bankoski et al. "VP8 Data Format and Decoding Guide; draft-bankoski-vp8-bitstream-02" Network Working Group. Internet-Draft, May 18, 2011, 288 pp.
Implementors' Guide; Series H: Audiovisual and Multimedia Systems; Coding of moving video: Implementors Guide for H.264: Advanced video coding for generic audiovisual services. H.264. International Telecommunication Union. Version 12. Dated Jul. 30, 2010.
ISR and Written Opinion (date of mailing: Oct. 15, 2012; PCT/US2012/040177, filed May 31, 2012.
Mozilla, "Introduction to Video Coding Part 1: Transform Coding", Video Compression Overview, Mar. 2012, 171 pp.
Multi-core processor, Wikipedia, the free encyclopedia. Http://wikipedia.org/wiki/Multi-core_processor; dated Apr. 30, 2012.
"Rosenberg, J. D. RTCWEB I-D with thoughts on the framework. Feb. 8, 2011. Retrieved fromhttp://www.ietf.org/mail-archive/web/dispatch/current/msg03383.html on Aug. 1, 2011."
"Rosenberg, J.D., et al. An Architectural Framework for Browser based Real-Time Communications (RTC) draft-rosenberg-rtcweb-framework-00. Feb. 8, 2011. Retrieved fromhttp://www.ietf.org/id/draft-rosenberg-rtcweb-framework-00.txt on Aug. 1, 2011."
Series H: Audiovisual and Multimedia Systems; Infrastructure of audiovisual services—Coding of moving video. H264. Advanced video coding for generic audiovisual services. International Telecommunication Union. Version 12. Dated Mar. 2010.
VP8 Data Format and Decoding Guide. WebM Project. Google On2. Dated: Dec. 1, 2010.
Wikipedia, the free encyclopedia, "Low-density parity-check code", http://en.wikipedia.org/wiki/Low-density_parity-check_code, Jul. 30, 2012 (5 pp).
Al-Omari, Huthaifa, et al; "Avoiding Delay Jitter in Cyber-Physical Systems Using One Way Delay Variations Model", Computational Science and Engineering, 2009 International Conference, IEEE (Aug. 29, 2009) pp. 295-302.
Bagni, D.—A constant quality single pass vbr control for dvd recorders, IEEE, 2003, pp. 653-662.
Balachandran, et al., Sequence of Hashes Compression in Data De-duplication, Data Compression Conference, Mar. 2008, p. 505, issue 25-27, United States.
Begen, Ali C., et al; "An Adaptive Media-Aware Retransmission Timeout Estimation Method for Low-Delay Packet Video", IEEE Transactions on Multimedia, vol. 9, No. 2 (Feb. 1, 2007) pp. 332-347.
Begen, Ali C., et al; "Proxy-assisted interactive-video services over networks wit large delays", Signal Processing: Image Communication, vol. 20, No. 8 (Sep. 1, 2005) pp. 755-772.
Cui, et al., Opportunistic Source Coding for Data Gathering in Wireless Sensor Networks, IEEE Int'l Conf. Mobile Ad Hoc & Sensor Systems, Oct. 2007, http://caltechcstr.library.caltech.edu/569/01HoCuiCodingWirelessSensorNetworks.pdf, United States.
David Slepian and Jack K. Wolf, Noiseless Coding of Correlated Information Sources, IEEE Transactions on Information Theory; Jul. 1973; pp. 471-480; vol. 19, United States.
Digital Video Processing, Prentice Hall Signal Processing Series, Chapter 6: Block Based Methods, Jun. 2014.
Feng, Wu-chi; Rexford, Jennifer; "A Comparison of Bandwidth Smoothing Techniques for the Transmission of Prerecorded Compressed Video", Paper, 1992, 22 pages.
Friedman, et al., "RTP: Control Protocol Extended Reports (RTPC XR)," Network Working Group RFC 3611 (The Internet Society 2003) (52 pp).
Fukunaga, S. (ed.) et al., MPEG-4 Video Verification Model VM16, International Organisation for Standardisation ISO/IEC JTC1/SC29/WG11 N3312 Coding of Moving Pictures and Audio, Mar. 2000.
Ghanbari Mohammad, "Postprocessing of Late Calls for Packet Video", IEEE Transactions on Circuits and Systems for Video Technology, vol. 6, No. 6, Dec. 1996, 10 pages.
Keesman, G.—Bit-rate control for MPEG encoders, Signal Processing Image communication 6 (1995) 545-560.
Khronos Group Inc. OpenMAX Integration Layer Application Programming Interface Specification. Dec. 16, 2005, 326 pages, Version 1.0.
Laoutaris, Nikolaos, et al; "Intrastream Synchronization for Continuous Media Streams: A Survey of Playout Schedulers", IEEE Network, IEEE Service Center, vol. 16, No. 3 (May 1, 2002) pp. 30-40.
Li, A., "RTP Payload Format for Generic Forward Error Correction", Network Working Group, Standards Track, Dec. 2007, (45 pp).
Liang, Yi J., et al; "Adaptive Playout Scheduling Using Time-Scale Modification in Packet Voice Communications", 2001 IEEE International Conference on Acoustics, Speech, and Signal Processing, vol. 3 (May 7, 2001), pp. 1445-1448.
Liu, Haining, et al; "On the Adaptive Delay and Synchronization Control of Video Conferencing over the Internet", International Conference on Networking (ICN) (2004) 8 pp.
Liu, Hang, et al; "Delay and Synchronization Control Middleware to Support Real-Time Multimedia Services over Wireless PCS Networks", IEEE Journal on Selected Areas in Communications, IEEE Service Center, vol. 17, No. 9 (Sep. 1, 1999) pp. 1660-1672.
Nethercote, Nicholas, et al,; "How to Shadow Every Byte of Memory Used by a Program", Proceedings of the 3rd International Conference on Virtual Execution Environments, Jun. 13-15, 2007 San Diego CA, pp. 65-74.
Roca, Vincent, et al., Design and Evaluation of a Low Density Generator Matrix (LDGM) Large Block FEC Codec, INRIA Rhone-Alpes, Planete project, France, Date Unknown, (12 pp), Jun. 2014.
Sekiguchi S. et al.: "CE5: Results of Core Experiment on 4:4:4 Coding", JVT Meeting: Mar. 31-Apr. 7, 2006 Geneva, CH; (Joint Videoteam of ISO/IEC JTC1/SC29/WG11 and ITU-T Sg. 16), No. JVT-S014, Apr. 1, 2006 pp. 1-19.
Sunil Kumar Liyang Xu, Mrinal K. Mandal, and Sethuraman Panchanathan, Error Resiliency Schemes in H.264/AVC Standard, Elsevier J. of Visual Communicatio & Image Representation (Special issue on Emerging H264/AVC Video Coding Standard), vol. 17 (2), Apr. 2006.
Trista Pei-Chun Chen and Tsuhan Chen, Second-Generation Error Concealment for Video Transport Over Error Prone Channels, electrical computer Engineering, Carnegie Mellon University, Pittsburgh, PA 15213, U.S.A, Jun. 2014.
Tsai, et al., The Efficiency and Delay of Distributed Source Coding in Random Access Sensor Networks, 8th IEEE Wireless Communications and Networking Conference, Mar. 2007, pp. 786-791, United States.
Vasudev Bhaskaran et al., "Chapter 6: The MPEG Video Standards", Image and Video Compression Standards—Algorithms & Architectures, Second Edition, 1997, pp. 149-230 Kluwer Academic Publishers.

(56) References Cited

OTHER PUBLICATIONS

Wang, et al., Distributed Data Aggregation using Clustered Slepian-Wolf Coding in Wireless Sensor Networks, IEEE International Conference on Communications, Jun. 2007, pp. 3616-3622, United States.

Wang, Yao "Error Control and Concealment for Video Communication: A Review", Proceedings of the IEEE, vol. 86, No. 5, May 1998, 24 pages.

Woo-Shik Kim et al: "Enhancements to RGB coding in H.264/MPEG-4 AVC. FRExt", Internet Citation, Apr. 16, 2005, XP002439981, Retrieved from the internet: URL:ftp3.itu.ch/av-arch/video-site/0504_Bus/VCEG-Z16.doc, retrieved on Jun. 28, 2007 p. 5.

"Series H: Audiovisual and Multimedia Systems; Infrastructure of audiovisual services—Coding of moving video; Advanced video coding for generic audiovisual services". H.264. Version 1. International Telecommunication Union. Dated May 2003.

"Series H: Audiovisual and Multimedia Systems; Infrastructure of audiovisual services—Coding of moving video; Advanced video coding for generic audiovisual services". H.264. Version 3. International Telecommunication Union. Dated Mar. 2005.

"Overview; VP7 Data Format and Decoder". Version 1.5. On2 Technologies, Inc. Dated Mar. 28, 2005.

"Series H: Audiovisual and Multimedia Systems; Infrastructure of audiovisual services—Coding of moving video; Advanced video coding for generic audiovisual services". H.264. Amendment 1: Support of additional colour spaces and removal of the High 4:4:4 Profile. International Telecommunication Union. Dated Jun. 2006.

"VP6 Bitstream & Decoder Specification". Version 1.02. On2 Technologies, Inc. Dated Aug. 17, 2006.

"Series H: Audiovisual and Multimedia Systems; Infrastructure of audiovisual services—Coding of moving video". H.264. Amendment 2: New profiles for professional applications. International Telecommunication Union. Dated Apr. 2007.

"VP6 Bitstream & Decoder Specification". Version 1.03. On2 Technologies, Inc. Dated Oct. 29, 2007.

"Series H: Audiovisual and Multimedia Systems; Infrastructure of audiovisual services—Coding of moving video". H.264. Advanced video coding for generic audiovisual services. Version 8. International Telecommunication Union. Dated Nov. 1, 2007.

"Series H: Audiovisual and Multimedia Systems; Infrastructure of audiovisual services—Coding of moving video". H.264. Advanced video coding for generic audiovisual services. International Telecommunication Union. Version 11. Dated Mar. 2009.

Page, E. S., "Continuous Inspection Schemes"; Biometrika 4I; Statistical Laboratory, University of Cambridge, (1954); pp. 100-115.

Extended European Search Report EP09171120, dated Aug. 2, 2010.

Schulzrinne, H, et al., "RTP: A Transport Protocol for Real-Time Applications", IETF, 2003, RFC 3550.

Gustafsson, F., "Adaptive Filtering and Change Detection", John Wiley & Sons, Ltd, 2000.

\* cited by examiner

METHOD AND DEVICE FOR DETERMINING A JITTER BUFFER LEVEL

CROSS-REFERENCES TO RELATED APPLICATIONS

This application is continuation of U.S. patent application Ser. No. 13/497,625, filed Mar. 22, 2012, which was a National Stage of International Application No. PCT/EP2010/063818, filed Sep. 20, 2010, and claimed priority to European Patent Application No. 09171120.0, filed Sep. 23, 2009, and U.S. Provisional Patent Application No. 61/245,003, filed Sep. 23, 2009, all of which are hereby incorporated by reference in their entireties.

TECHNICAL FIELD

The present disclosure generally relates to electrical telecommunication and more particularly to data packet delivery in networks using the Internet protocol (IP).

BACKGROUND

In a video-over-IP system, each image, or frame, may be encoded into one or several data packets that are sent with minimal delay ("back-to-back") to the IP network. The frames are usually produced at a constant frame rate, wherefore the packet clusters are sent at the same constant rate. On the receiver side the packets arrive with a variable delay. This delay is mainly due to the delays inflicted by the IP network and is often referred to as jitter. The severity of the jitter can vary significantly depending on network type and current network conditions. For example, the variance of the packet delay can change with several orders of magnitude from one network type to another, or even from one time to another on the same network path.

In order to reproduce a video stream that is true to the original that was transmitted from the source(s), the decoder (or receiver) must be provided with data packet clusters at the same constant rate with which the data packet clusters were sent. A device often referred to as a jitter buffer may be introduced in the receiver. The jitter buffer may be capable of de-jittering the incoming stream of packets and providing a constant flow of data to the decoder. This is done by holding the packets in a buffer, thus introducing delay, so that also the packets that were subject to larger delays will have arrived before their respective time-of-use.

There is an inevitable trade-off in jitter-buffers between buffer delay on the one hand and distortions due to late arrivals on the other hand. A lower buffer level, and thus a shorter delay, generally results in a larger portion of packets arriving late or even being discarded, as the packets may be considered as being too late, while a higher buffer level, and thus a longer delay, is generally detrimental in itself for two-way communication between, e.g., humans.

BRIEF SUMMARY

It is with respect to the above considerations and others that the present invention has been made. In particular, the inventors have realized that it would be desirable to achieve a method for determining a buffer level of a jitter data buffer comprised in a receiver adapted to sequentially receive data packets from a communications network, wherein frames are encoded into the data packets, which method is capable of determining the appropriate buffer level in various network conditions. Furthermore, the inventors have realized that it would be desirable to determine the buffer level of a jitter data buffer on the basis of a first part of frame arrival delay related to payload size variation between frames and a second part related to the amount of crosstraffic in the communications network.

To better address one or more of these concerns, a method and a receiver having the features defined in the independent claims are provided. Further advantageous embodiments of the present invention are defined in the dependent claims.

According to a first aspect of the present invention, there is provided a method for determining a buffer level of a jitter data buffer comprised in a receiver adapted to sequentially receive data packets from a communications network, wherein frames are encoded into the data packets, each frame comprising timestamp information T and payload size information L. The buffer level is determined on the basis of a first part of frame arrival delay related to payload size variation between frames and a second part related to the amount of crosstraffic in the communications network. The method may comprise, for each frame, determining a frame pay-load size difference $\Delta L$ by comparing L of the current frame with L of a previous frame, determining a frame inter-arrival time $\Delta t$ by comparing the measured arrival time of the current frame with the measured arrival time of a previous frame, determining a temporal frame spacing $\Delta T$ by comparing T of the current frame with T of a previous frame, and/or determining a frame network transit delay d on the basis of the difference between $\Delta t$ and $\Delta T$. The method may comprise, for each frame, estimating a set of parameters of a linear relationship between $\Delta L$ and d on the basis of $\Delta L$ and d for the current frame and $\Delta L$ and d determined for at least one previous frame. A first parameter and a second parameter comprised in the set may be adapted to be indicative of the first and second part, respectively. The method may comprise, for each frame, estimating a maximum frame payload size and an average frame payload size on the basis of L of the current frame and L of at least one previous frame. For each frame, the buffer level may be determined on the basis of the maximum frame payload size, the average frame payload size and the parameters of the linear relationship.

Such a configuration enables the determination of an appropriate buffer level of the jitter buffer in various network conditions, by determining the buffer level on the basis of statistical measures of current network conditions. In this manner, both frame arrival delay related to payload size variation between frames ('self-inflicted' frame arrival delay) and a frame arrival delay related to the amount of crosstraffic in the communications network may be taken into account in the determination of the buffer level. This is generally not the case in known devices and methods.

By the separation of the packet delay contributions into self-inflicted and cross-traffic delays, an improved adaptability to varying network conditions may be obtained. For instance, consider a typical situation where a majority of the frames are roughly equal in size (i.e. having a roughly equal payload size), while few frames are relatively large (e.g. in comparison with the majority of frames). Conventionally, only the frame inter-arrival time is considered in the procedure of setting the buffer level. In such a case, only the few packets that result in the largest inter-arrival time would provide any useful information for the procedure of setting the buffer level. In contrast, according to embodiments of the present invention, all of the frames encoded in the arriving packets in general contributes with information that may be utilized for estimating the set of parameters of a linear relationship between $\Delta L$ and d. In this manner, an improved accuracy and an increased adaptability with regards to varying network conditions may be achieved.

According to a second aspect of the present invention, there is provided a receiver adapted to sequentially receive data packets from a communications network. Frames are encoded into the data packets, each frame comprising timestamp information T and payload size information L. The receiver may comprise a jitter data buffer and a processing unit adapted to determine a buffer level of the jitter data buffer on the basis of a first part of frame arrival delay related to payload size variation between frames and a second part related to the amount of cross-traffic in the communications network. The receiver may comprise a time measuring unit adapted to measure the arrival time of each frame. The receiver, or the processing unit, may be adapted to, for each frame, determine a frame payload size difference $\Delta L$ by comparing L of the current frame with L of a previous frame, determine a frame inter-arrival time $\Delta t$ by comparing the measured arrival time of the current frame with the measured arrival time of a previous frame, determine a temporal frame spacing $\Delta T$ by comparing T of the current frame with T of a previous frame, and/or determine a frame network transit delay d on the basis of the difference between $\Delta t$ and $\Delta T$. The receiver, or the processing unit, may be adapted to, for each frame, estimate a set of parameters of a linear relationship between $\Delta L$ and d on the basis of $\Delta L$ and d for the current frame and $\Delta L$ and d determined for at least one previous frame. A first parameter and a second parameter comprised in the set are indicative of the first and second part, respectively. The receiver, or the processing unit, may be adapted to, for each frame, estimate a maximum frame payload size and an average frame payload size on the basis of L of the current frame and L of at least one previous frame. For each frame, the buffer level may be determined on the basis of the maximum frame payload size, the average frame payload size and the parameters of the linear relationship.

By such a receiver, or decoder, there may be provided a receiver (or decoder) adapted to sequentially receive data packets from a communications network, which receiver (or decoder) may achieve the same or similar advantages achieved by the method according to the first aspect of the present invention.

According to a third aspect of the present invention, there is provided a computer program product adapted to, when executed in a processor unit, perform a method according to the first aspect of the present invention or any embodiment thereof.

According to a fourth aspect of the present invention, there is provided a computer-readable storage medium on which there is stored a computer program product adapted to, when executed in a processor unit, perform a method according to the first aspect of the present invention or any embodiment thereof.

Such a processing unit, or microprocessor, may for example be comprised in a receiver, or decoder, according to the second aspect of the present invention. Alternatively, or optionally, such processing unit or microprocessor may be arranged externally in relation to the receiver or decoder, with the processing unit or microprocessor being electrically connected to the receiver or decoder.

The first and second parameters may for example comprise a slope and a variance.

The estimation of the parameters of a linear relationship between between $\Delta L$ and d may for example be performed by means of an adaptive filter algorithm, such as adaptive linear regression, recursive least-squares estimation, a Kalman filter, etc. Such adaptive filter algorithms may be used in different combinations. By utilizing one or more adaptive filter algorithms, the accuracy of the estimation of the linear relationship between between $\Delta L$ and d may be refined by the choice of the adaptive filter algorithm(s) and/or the model parameters of the respective adaptive filter algorithm. For example, the adaptive filter algorithm(s) may be selected and/or the parameters thereof may be modified on the basis of user, capacity and/or application requirements.

There may be determined whether the absolute value of a difference between d for the current frame and at least one of the first part of frame arrival delay, related to payload size variation between frames, for respective previous frames exceeds a predetermined threshold value.

In other words, a so called "sanity" check, or extreme outlier identification, can be made on the measurements (e.g. frame payload sizes, arrival time differences) prior to performing an estimation of a set of parameters of a linear relationship between $\Delta L$ and d. In this manner, the effect of undesired, spurious events in the data packet delivery in the communication network may be avoided or mitigated.

An indication of a discontinuous change in a parameter of the communications network may be sensed. The parameter may be indicative of traffic conditions of the communications network.

In other words, so called change detection may be performed to assess whether a discontinuous, or abrupt, change has occurred in traffic conditions of the communications network. Such change detection may be performed in various manners, for example in accordance with user, capacity and/or application requirements. For example, change detection may be performed by means of a CUSUM test.

In case an indication of a discontinuous change in the parameter is sensed, at least one model parameter used in the estimation of the parameters of a linear relationship between $\Delta L$ and d may be reset. In this manner, re-convergence of the process of estimating a set of parameters of a linear relationship between $\Delta L$ and d for the new network conditions may be facilitated.

The at least one model parameter may for example comprise a Kalman covariance matrix, a noise estimate, etc., depending on implementation details.

There may be determined, on the basis of T of the current frame and T of the previous frame, whether the previous frame was transmitted earlier with regards to transmission order compared to the current frame. In other words, it may be checked whether the current frame has suffered from re-ordering. In this case, the processing of the current frame may be stopped and discarded. Subsequently, the receiver may await the arrival of the next frame for processing thereof.

According to another aspect of the teachings herein, a method includes determining a frame payload size difference for a plurality of video frames encoded into data packets sequentially received from a communications network, wherein a frame payload size difference is a difference in a payload size of a current frame and a payload size of a previous frame, determining a frame network transit delay for the plurality of video frames, wherein the frame network transit delay is a difference in a transport time between the current frame and the previous frame and an expected transport time between the current frame and the previous frame, determining a slope and a variance of a linear relationship between the frame payload size difference and the frame network transit delay for the plurality of video frames, and determining a buffer level of a jitter data buffer using a maximum frame payload size, an average frame payload size, the slope and the variance.

According to another aspect of the teachings herein, an apparatus includes memory and a processing unit. The processing unit is configured to execute instructions stored in the memory to determine a frame payload size difference for a plurality of video frames encoded into data packets sequentially received from a communications network, wherein a frame payload size difference is a difference in a payload size of a current frame and a payload size of a previous frame, determine a frame network transit delay for the plurality of video frames, wherein the frame network transit delay is a difference in a transport time between the current frame and the previous frame and an expected transport time between the current frame and the previous frame, determine a slope and a variance of a linear relationship between the frame payload size difference and the frame network transit delay for the plurality of video frames, and determine a buffer level of a jitter data buffer using a maximum frame payload size, an average frame payload size, the slope and the variance, the jitter data buffer located in the memory.

Further objects and advantages of the present invention are described in the following by means of exemplifying embodiments.

BRIEF DESCRIPTION OF THE DRAWINGS

Exemplifying embodiments of the present invention will be described in the following with reference to the other accompanying drawings, in which.

In the accompanying drawings, the same reference numerals denote the same or similar elements throughout the views.

DETAILED DESCRIPTION

The present invention will now be described more fully hereinafter with reference to the accompanying drawings, in which exemplifying embodiments of the invention are shown. This invention may, however, be embodied in many different forms and should not be construed as limited to the embodiments set forth herein; rather, these embodiments are provided by way of example so that this disclosure will be thorough and complete, and fully convey the scope of the invention to those skilled in the art. Furthermore, like numbers refer to like or similar elements or components throughout. The steps of any method disclosed herein do not have to be performed in the exact order disclosed, unless explicitly stated.

According to the present invention, the transmission delay of a packet or cluster of packets may be considered to be made up of two independent parts: self-inflicted delay and cross-traffic delay. Because a large packet (i.e. having a large payload) generally takes a longer time to transmit over a network link with limited capacity compared to a smaller packet, the payload size variations from one image (or frame) to the next generally give rise to a payload-size dependent delay variation, which is referred to in the context of some embodiments of the present invention as self-inflicted delay. Any delays that arise because of other network traffic (cross-traffic) utilizing the links and queues of the network are referred to in the context of some embodiments of the present invention as the cross-traffic delay. To the receiver, the cross-traffic delay may appear as quasi-random and independent of the (video) traffic.

The present invention is based on separating the packet delay contributions into self-inflicted and cross-traffic delays, estimating appropriate parameters describing the current conditions for the self-inflicted delay and the cross-traffic delay, and determining an appropriate jitter buffer level based on the estimates.

In a video-over-IP system, the encoder may operate on clusters of packets that make up each image. In the context of some embodiments of the present invention, such a group of packets is referred to as a 'frame'. When the arrival of a frame is completed at the receiver, i.e. when all the packets included in the frame have arrived at the receiver, the arrival time may be determined. Comparing the arrival time with the arrival time of a previously received frame provides a frame inter-arrival time $\Delta t$.

In general, each frame comprises some kind of timing information, or time-stamp information, that indicates the production time of the frame. Such timing information may for example comprise the timestamp field in a real-time transport protocol (RTP) header. Such timing information may provide a nominal temporal frame spacing between the present frame and a previously received frame, denoted $\Delta T$. The nominal temporal frame spacing $\Delta T$ may for example comprise the time between capturing the two frames from a camera. By determining a difference between the actual inter-arrival time $\Delta t$ and the nominal temporal frame spacing $\Delta T$ a deviation measure, or a frame network transit delay, d for the currently received frame may be obtained. For example, $d = \Delta t - \Delta T$.

In general, each frame comprises payload size information L. The difference $\Delta L$ between the payload size between the currently received frame and a previously received frame may be determined.

The self-inflicted delay and the cross-traffic delay described in the foregoing may be described as a part of d that can be attributed to $\Delta L$ and a part that generally cannot be attributed to $\Delta L$. Namely, in case of a relatively large value of $\Delta L$, the current frame is larger than the previous frame, and the current frame may generally be expected to be later than the previous frame. This would result in an increased $\Delta t$, resulting in a larger value of d. On the other hand, the cross-traffic related delay generally affects $\Delta t$ in ways that are difficult to correlate with $\Delta L$.

On receiving the complete frame with frame number k, the frame delay $d(k)=\Delta t(k)-\Delta T(k)=t(k)-t(k-1)-(T(k)-T(k-1))$ may be calculated. The payload size difference is denoted $\Delta L(k)=L(k)-L(k-1)$. The differential frame delay, or frame network transit delay, may be assumed to follow the model:

$$d(k)=A+B\Delta L(k)+w(k),$$

where $w(k)$ represents the cross-traffic related delay. It may be assumed that $w(k)$, $k=0, 1, 2, \ldots$ is a sequence of independent realizations of a zero-mean stochastic variable with variance $\sigma^2$. Hence, the relation between $d(k)$ and $\Delta L$ may be represented by a straight line with offset A and slope B, with a scattering around the line determined by $\sigma^2$.

Figure 1:
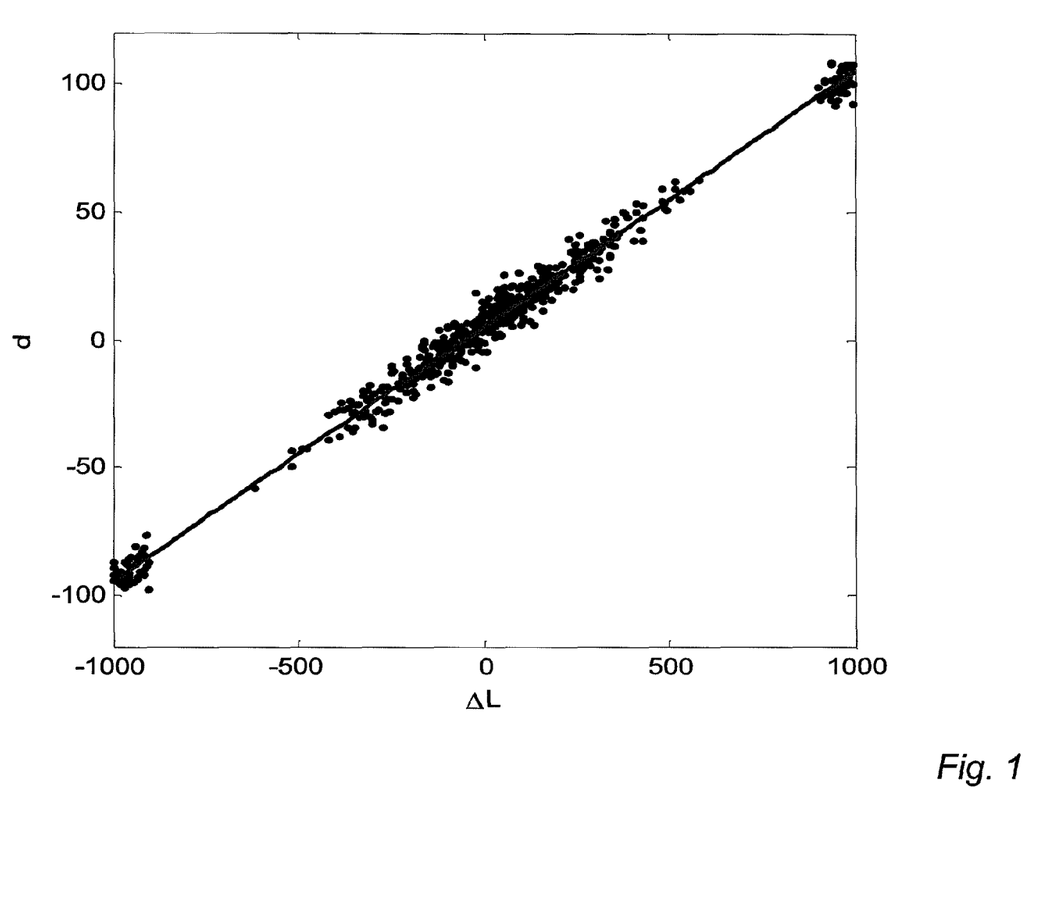
FIG. 1 is a schematic exemplifying graph of the frame network transit delay d versus the frame payload size difference $\Delta L$.

In view of the foregoing description and with reference to FIG. 1, in FIG. 1 there is shown a schematic exemplifying straight line and scatter plot of the frame network transit delay d versus the frame payload size difference ΔL. The quantities d and ΔL may for example be given in units of ms and bytes, respectively.

Given estimates of the parameters A, B and $\sigma^2$, respectively, and knowledge of the largest expected ΔL, the worst case frame inter-arrival time may be estimated. On the basis of this worst case frame inter-arrival time a size of the jitter buffer may be set that mitigates the jitter.

In view of the above, an embodiment of the present invention may comprise collecting measurements of d(k) and ΔL(k) for a number of frames k, estimating parameters A, B, and $\sigma^2$, storing or estimating the largest expected frame size difference ΔL, and determining a jitter buffer level based on the estimates.

Figure 2A:
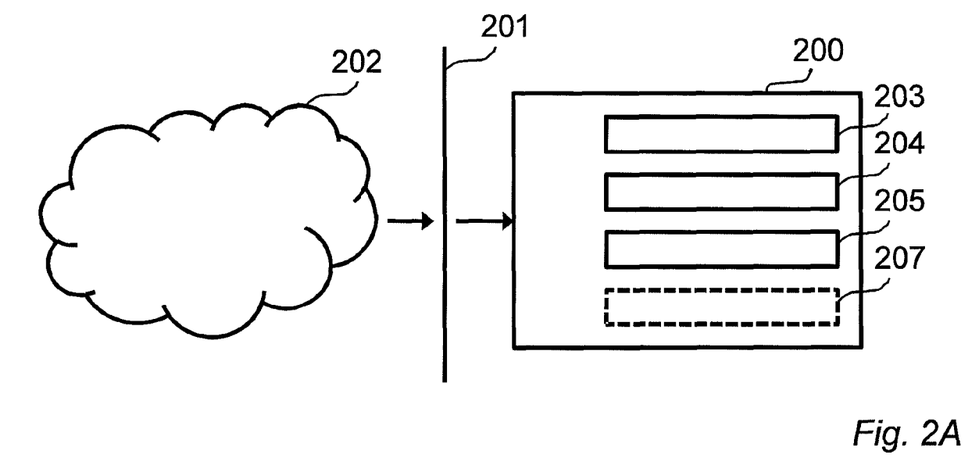
FIG. 2A is a schematic view of a receiver according to an exemplifying embodiment of the present invention.

Referring now to FIG. 2A, there is shown a schematic view of a receiver 200 according to an exemplifying embodiment of the present invention. The receiver 200 is communicating in a wireless manner with a communications network 202 via an air interface 201. The receiver comprises a data jitter buffer 203. The receiver may comprise a time-measuring unit 204 and a processing unit 205.

The communication between the receiver 200 and the communications network 202 may be performed in a non-wired (e.g. by means of wireless radiowave communications) or a wired (e.g. by means of electrical conductors or optical fibers or the like) fashion.

Figure 2B:
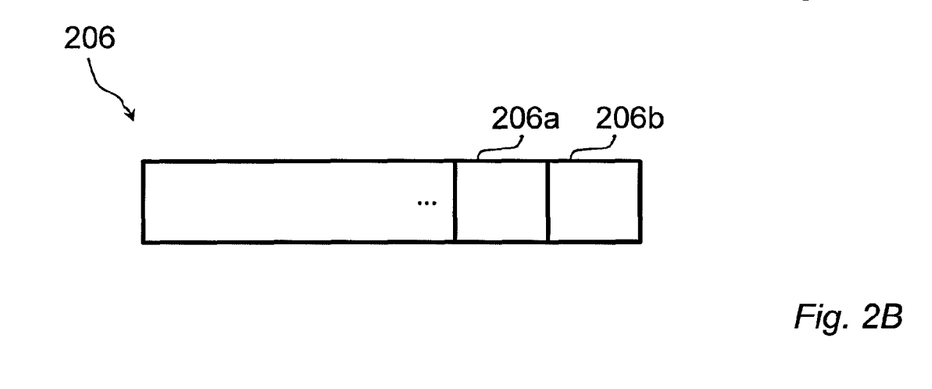
FIG. 2B is a schematic view of a frame in accordance with an exemplifying embodiment of the present invention.

Referring now to FIG. 2B, the receiver 200 may be adapted to sequentially receive data packets from the communications network 202, wherein frames 206 are encoded into the data packets, each frame 206 comprising timestamp information T 206a and payload size information L 206b. Each frame 206 may alternatively or optionally comprise additional information. According to an embodiment of the present invention, the buffer level of the data jitter buffer 203 is determined on the basis of a first part of frame arrival delay related to payload size variation between frames and a second part related to the amount of crosstraffic in the communications network 202.

Optionally, or alternatively, the receiver 200 may comprise a sensing unit 207, which may be adapted to sense an indication of a discontinuous change in a parameter of the communications network 202. This parameter may for example be indicative of traffic conditions in the communications network 202.

Figure 3:
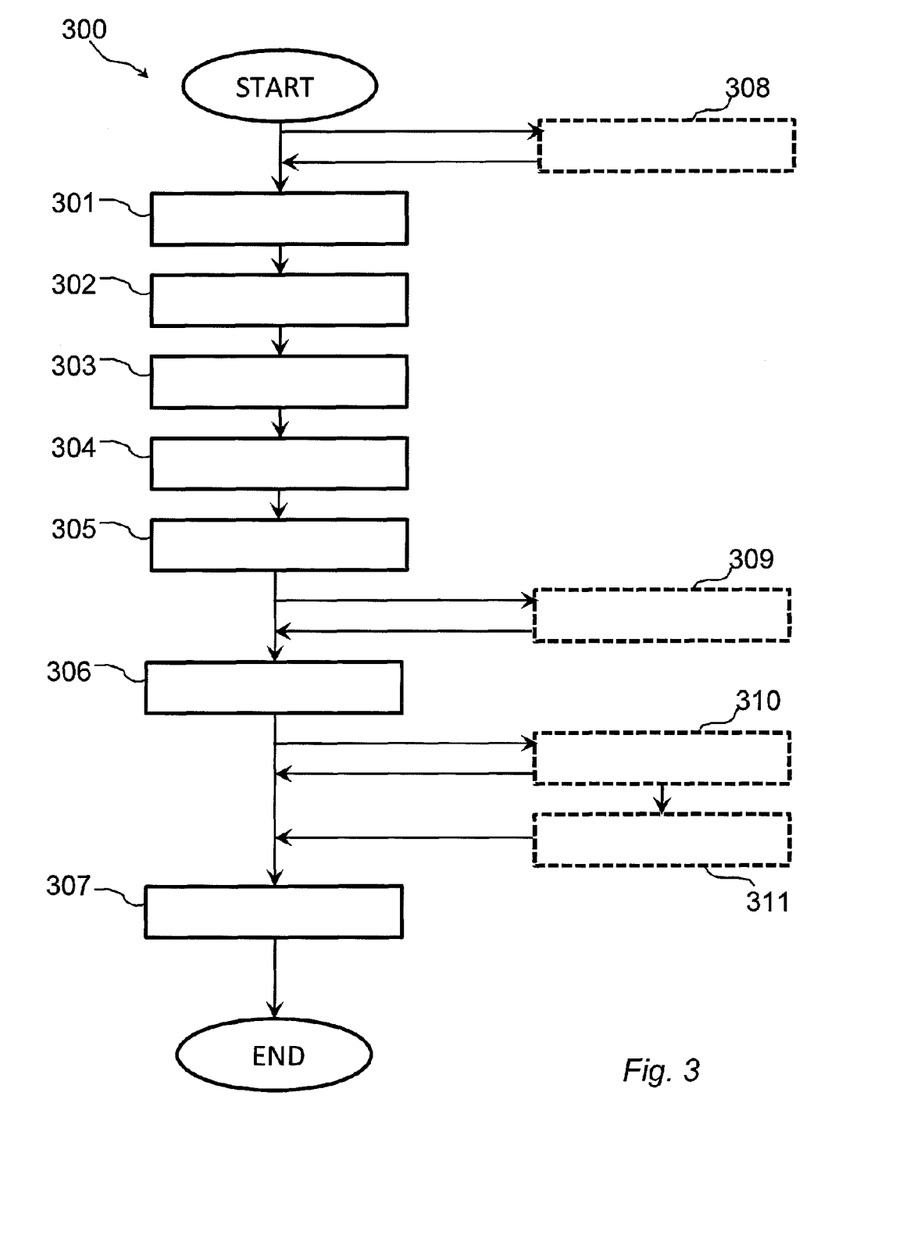
FIG. 3 is a schematic flow diagram of a method according to an exemplifying embodiment of the present invention.

Referring now to FIG. 3, there is shown a schematic flow diagram of a method 300 according to an exemplifying embodiment of the present invention. With reference to FIGS. 2A and 2B, a receiver 200 may be adapted to sequentially receive data packets from a communications network 202. The data packets may be such that frames 206 are encoded in the data packets.

Referring now again to FIG. 3, at step 301 a frame payload size difference ΔL may be determined for each frame by comparing L of the current frame with L of a previous frame.

At step 302, a frame inter-arrival time Δt may be determined by comparing the measured arrival time of the current frame with the measured arrival time of a previous frame.

At step 303, a temporal frame spacing ΔT may be determined by comparing T of the current frame with T of a previous frame.

At step 304, a frame network transit delay d may be determined on the basis of the difference between Δt and ΔT.

The method 300 may further comprise, for each frame, in step 305 estimating a set of parameters of a linear relationship between ΔL and d on the basis of ΔL and d for the current frame and ΔL and d determined for at least one previous frame. With reference to FIGS. 2A and 2B, a first parameter and a second parameter comprised in the set may be adapted to be indicative of a first part of frame arrival delay related to payload size variation between frames 206 and a second part related to the amount of crosstraffic in the communications network 202.

The method 300 may further comprise, for each frame, in step 306 estimating a maximum frame payload size and an average frame payload size on the basis of L of the current frame and L of at least one previous frame.

The method 300 may further comprise, for each frame, a step 307 of determining the buffer level on the basis of the maximum frame payload size, the average frame payload size and the parameters of the linear relationship.

Optionally, the method 300 may comprise a step 308 comprising determining, on the basis of T of the current frame and T of the previous frame, whether the previous frame was transmitted earlier with regards to transmission order compared to the current frame.

Optionally, the method 300 may comprise a step 309 comprising determining whether the absolute value of a difference between d for the current frame and at least one of the first part of frame arrival delay, related to payload size variation between frames, for respective previous frames exceeds a predetermined threshold value.

Optionally, the method 300 may comprise a step 310 comprising sensing an indication of a discontinuous change in a parameter of the communications network. The parameter may for example be indicative of traffic conditions in the communications network. Optionally, if an indication of a discontinuous change in such a parameter has been sensed, at least one model parameter used in the estimation of the parameters of a linear relationship between ΔL and d may be reset (step 311).

In the following, a method according to an exemplifying embodiment of the present invention is described in some detail.

The method of the exemplifying embodiment can be described using three phases—inter-arrival delay calculation, parameter estimation and buffer level calculation—each phase being carried out at least once each time arrival of a frame is completed, i.e. when all the packets included in the frame have arrived at the receiver. Additionally, there may be a reset phase, carried out in the beginning of the method and also when otherwise found necessary. The phases are described in the following.

The following notation is used in the description in the following:

F: The last received frame that is currently being processed.
$F_p$: A previously processed frame.
t: Arrival time for frame F (the time at which the arrival of the frame is completed at the receiver).
$t_p$: Arrival time for frame $F_p$.
T: Timestamp for frame F.
$T_p$: Timestamp for frame $F_p$.
L: Payload size (in the communications network) for frame F.
$L_p$: Payload size (in the communications network) for frame $F_p$.
$L_{avg}(k)$: The k-th update of the estimated average payload size.
$\phi$: Filter factor for estimate $L_{avg}$; $0 \leq \phi \leq 1$.
$L_{max}(k)$: The k-th update of the estimated maximum payload size.
$\psi$: Filter factor for estimate $L_{max}$; $0 \leq \psi \leq 1$.
$C_1$: Design parameter; $C_1 > 0$.
$C_2$: Design parameter; $C_2 > 0$.
$\sigma^2(k)$: The k-th update of the estimated noise variance.
m(k): The k-th update of the estimated noise mean.
D(k): The k-th update of the desired buffer level.

A(k): The k-th update of the line offset.
B(k): The k-th update of the line slope.
M (k|k−1) and M(k|k): Predictor and measurement updates, respectively, of the Kalman filter covariance matrix.
K(k): Kalman filter gain vector in the k-th iteration.
Q: Kalman filter process noise covariance matrix.
I: 2-by-2 identity matrix.

Reset Phase I

At time index k=0, all parameters and variables may be reset to suitable initial values. What constitutes a suitable initialization may vary depending on current communications network conditions and application.

Inter-Arrival Delay Calculation

In case the current frame has suffered from re-ordering (in other words, if the current frame is earlier in (transmission-order) sequence than the last processed frame), the processing for the current frame may be stopped and the current frame may be discarded.

In other case, a nominal inter-arrival time is calculated using the timestamps of the current frame and a previously received frame:

$$\Delta T = T - T_p.$$

The actual inter-arrival time is calculated:

$$\Delta t = t - t_p.$$

The frame network transit delay is calculated:

$$d = \Delta t - \Delta T.$$

All of these times and time periods may be adjusted in order to use the same time scale, e.g., milliseconds or sample periods.

Parameter Estimation

Another phase in the exemplifying method is to estimate the model parameters.

A frame size difference is calculated:

$$\Delta L = L - L_p.$$

The average estimate for frame size is calculated:

$$L_{avg}(k) = \phi L_{avg}(k-1) + (1-\phi)L.$$

The estimate of the maximum frame size is calculated:

$$L_{max}(k) = \max\{\psi L_{max}(k-1); L\}.$$

An extreme outlier identification may then be performed. Let $$\delta = d - (A(k-1) + B(k-1)\Delta L).$$

In case $|\delta| \geq C_1 \sqrt{\sigma^2(k-1)}$, the current frame may be considered to be an extreme outlier.

Next, on one hand, if the current frame is not an extreme outlier:

Update average noise: $m(k) = \alpha m(k-1) + (1-\alpha)\delta$.
Update noise variance: $\sigma^2(k) = \alpha\sigma^2(k-1) + (1-\alpha)(\delta - m(k))^2$.
Update the estimates of A and B using, e.g., a Kalman filter iteration:
Covariance matrix predictor update:

$$M(k|k-1) = M(k-1/k-1) + Q.$$

Compute Kalman gain vector:

$$K(k) = \frac{M(k|k-1)\begin{bmatrix}\Delta L \\ 1\end{bmatrix}}{f + [\Delta L \ 1]M(k|k-1)\begin{bmatrix}\Delta L \\ 1\end{bmatrix}}$$

where the function f may be:

$$f = \left(300\, e^{-\frac{|\Delta L|}{L_{max}(k)}} + 1\right)\sqrt{\sigma^2(k)}.$$

Update estimates of A and B:

$$\begin{bmatrix}B(k) \\ A(k)\end{bmatrix} = \begin{bmatrix}B(k-1) \\ A(k-1)\end{bmatrix} + K(k)(d - A(k-1) + B(k-1)\Delta L).$$

Calculate covariance matrix measurements:

$$M(k|k) = (I - K(k)[\Delta L \ 1])M(k|k-1).$$

On the other hand, if the current frame is an extreme outlier: Let $s_\delta$ be the sign function of $\delta$, i.e., $$s_\delta = \begin{cases}-1, & \delta < 0; \\ +1, & \delta \geq 0.\end{cases}$$

Calculate average noise: $m(k) = \alpha m(k-1) + (1-\alpha)s_\delta C_1 \sqrt{\sigma^2(k-1)}$.

Calculate noise variance: $\sigma^2(k) = \alpha\sigma^2(k-1) + (1-\alpha)(s_\delta C_1 \sqrt{\sigma^2(k-1)} - m(k))^2$.

Reset Phase II

Next, change detection may be performed in order to assess whether an abrupt change has occurred in the network. Change detection can be performed in many manners, for example by utilizing a CUSUM test. In case an abrupt change is detected, a suitable set of variables may be reset. For instance, the Kalman covariance matrix M(k|k) can be reset to its initial (large) value in order to facilitate a rapid re-convergence to the new communication network conditions. Alternatively or optionally, the noise estimates $\sigma^2(k)$ and/or m(k) can be reset.

Buffer Level Calculation

The last phase in the exemplifying method comprises calculation of the desired buffer level:

$$D(k) = B(k)(L_{max} - L_{avg}) + C_2\sqrt{\sigma^2(k)}.$$

Figure 4:
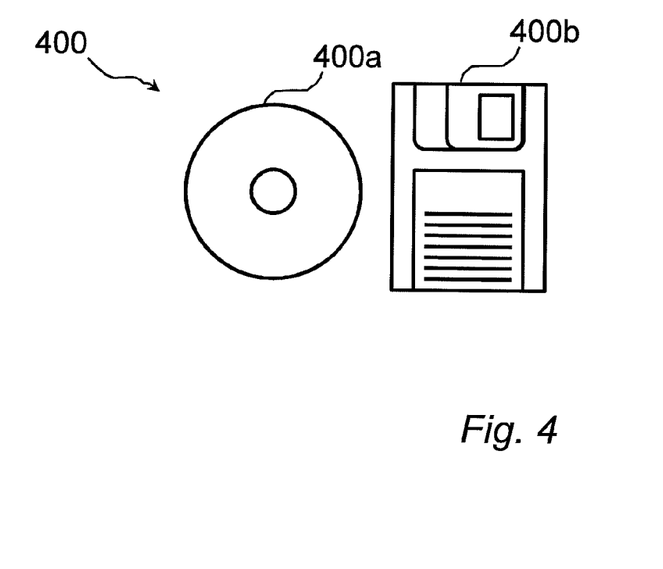
FIG. 4 are schematic views of different exemplifying types of computer readable digital storage mediums according to embodiments of the present invention.

Referring now to FIG. 4, there are shown schematic views of computer readable digital storage mediums 400 according to exemplifying embodiments of the present invention, comprising a DVD 400a and a floppy disk 400b. On each of the DVD 400a and the floppy disk 400b there may be stored a computer program comprising computer code adapted to perform, when executed in a processor unit, a method according to the present invention or embodiments thereof, as has been described in the foregoing.

Although only two different types of computer-readable digital storage mediums have been described above with reference to FIG. 4, the present invention encompasses embodiments employing any other suitable type of computer-readable digital storage medium, such as, but not limited to, a non-volatile memory, a hard disk drive, a CD, a flash memory, magnetic tape, a USB stick, a Zip drive, etc.

The receiver may comprise one or more microprocessors (not shown) or some other device with computing capabilities, e.g. an application specific integrated circuit (ASIC), a field programmable gate array (FPGA), a complex programmable logic device (CPLD), etc., in order to perform operations such as estimating a set of parameters of a linear relationship between $\Delta L$ and d. Such a microprocessor may alternatively or optionally be comprised in, integrated with, or be, the processing unit of the receiver.

When performing steps of different embodiments of the method of the present invention, the microprocessor typically executes appropriate software that is downloaded to the receiver and stored in a suitable storage area, such as, e.g., a Random Access Memory (RAM), a flash memory or a hard disk, or software that has been stored in a non-volatile memory, e.g., a Read Only Memory (ROM). Such a microprocessor or processing unit may alternatively or optionally be located externally relatively to the receiver (and electrically connected to the receiver).

A computer program product comprising computer code adapted to perform, when executed in a processor unit, a method according to the present invention or any embodiment thereof may be stored on a computer (e.g. a server) adapted to be in communication with a receiver according to an exemplifying embodiment of the present invention. In this manner, when loaded into and executed in a processor unit of the computer, the computer program may perform the method. Such a configuration eliminates the need to store the computer program locally at the receiver. The communication between the computer and the receiver may be implemented in a wired fashion (e.g. by means of Ethernet) or in a non-wired fashion (e.g. by means of wireless infra-red (IR) communications or other wireless optical communications, or by means of wireless radiowave communications.

While the invention has been illustrated and described in detail in the appended drawings and the foregoing description, such illustration and description are to be considered illustrative or exemplifying and not restrictive; the invention is not limited to the disclosed embodiments. Other variations to the disclosed embodiments can be understood and effected by those skilled in the art in practicing the claimed invention, from a study of the drawings, the disclosure, and the appended claims. The mere fact that certain measures are recited in mutually different dependent claims does not indicate that a combination of these measured cannot be used to advantage. Any reference signs in the claims should not be construed as limiting the scope.

What is claimed is:

1. A method, comprising:
    determining, using a processing unit, a frame payload size difference for a plurality of video frames encoded into data packets sequentially received from a communications network, wherein a frame payload size difference is a difference in a payload size of a current frame and a payload size of a previous frame;
    determining, using the processing unit, a frame network transit delay for the plurality of video frames, wherein the frame network transit delay is a difference in a transport time between the current frame and the previous frame and an expected transport time between the current frame and the previous frame;
    determining, using the processing unit, a slope and a variance of a linear relationship between the frame payload size difference and the frame network transit delay for at least some of the plurality of video frames; and
    determining a buffer level of a jitter data buffer using a maximum frame payload size, an average frame payload size, the slope and the variance, the jitter data buffer located in memory associated with the processing unit.

2. The method of claim 1, further comprising:
    calculating the expected transport time between the current frame and the previous frame by comparing timestamp information of the previous frame with timestamp information of the current frame.

3. The method of claim 2, further comprising:
    calculating the transport time between the current frame and the previous frame by comparing a measured arrival time of the current frame with a measured arrival time of the previous frame.

4. The method of claim 1, further comprising:
    calculating the transport time between the current frame and the previous frame by comparing a measured arrival time of the current frame with a measured arrival time of the previous frame.

5. The method of claim 1 wherein determining the slope and the variance comprises:
    performing an adaptive filter algorithm updated upon arrival of each frame.

6. The method of claim 1, further comprising:
    before determining the slope and the variance, identifying whether a frame of the plurality of frames has an absolute value of a difference between its frame network transit delay and a portion of frame network transit delay attributable to payload size variation between previous frames that exceeds a threshold value.

7. The method of claim 6, further comprising:
    updating the linear relationship differently based on whether or not the absolute value exceeds the threshold.

8. The method of claim 1, further comprising:
    sensing a discontinuous change in a parameter of the communications network, the parameter being indicative of traffic conditions in the communications network; and
    adjusting at least one parameter used to determine the slope and the variance of the linear relationship based on the discontinuous change.

9. The method of claim 8 wherein adjusting at least one parameter comprises resetting the at least one parameter.

10. The method of claim 1, further comprising:
    determining whether the current frame was transmitted earlier than the previous frame with regards to a transmission order of the plurality of frames.

11. The method of claim 10, further comprising:
    omitting the current frame from determining the slope and the variance of the linear relationship when the current frame was transmitted earlier with regards to the transmission order.

12. An apparatus, comprising:
    memory; and
    a processing unit configured to execute instructions stored in the memory to:
        determine a frame payload size difference for a plurality of video frames encoded into data packets sequentially received from a communications network, wherein a frame payload size difference is a difference in a payload size of a current frame and a payload size of a previous frame;
        determine a frame network transit delay for the plurality of video frames, wherein the frame network transit delay is a difference in a transport time between the current frame and the previous frame and an expected transport time between the current frame and the previous frame;
        determine a slope and a variance of a linear relationship between the frame payload size difference and the frame network transit delay for the plurality of video frames; and
        determine a buffer level of a jitter data buffer using a maximum frame payload size, an average frame payload size, the slope and the variance, the jitter data buffer located in the memory.

13. The apparatus of claim 12 wherein the processing unit is configured to:
   calculate the expected transport time between the current frame and the previous frame by comparing timestamp information of the previous frame with timestamp information of the current frame.

14. The apparatus of claim 12 wherein the processing unit is configured to:
   calculate the transport time between the current frame and the previous frame by comparing a measured arrival time of the current frame with a measured arrival time of the previous frame.

15. The apparatus of claim 12 wherein the processing unit is configured to determine the slope and the variance by:
   performing an adaptive filter algorithm updated upon arrival of each frame.

16. The apparatus of claim 12 wherein the processing unit is configured to, before determining the slope and the variance, identify whether a frame of the plurality of frames has an absolute value of a difference between its frame network transit delay and a portion of frame network transit delay attributable to payload size variation between previous frames that exceeds a threshold value.

17. The apparatus of claim 16 wherein the processing unit is configured to:
   update the linear relationship differently based on whether or not the absolute value exceeds the threshold.

18. The apparatus of claim 12 wherein the processing unit is configured to:
   sense a discontinuous change in a parameter of the communications network, the parameter being indicative of traffic conditions in the communications network; and
   reset at least one parameter used to determine the slope and the variance of the linear relationship based on the discontinuous change.

19. The apparatus of claim 12 wherein the processing unit is configured to:
   determine whether the current frame was transmitted earlier that the previous frame with regards to a transmission order of the plurality of frames.

20. The apparatus of claim 19 wherein the processing unit is configured to:
   omit the current frame from determining the slope and the variance of the linear relationship when the current frame was transmitted earlier with regards to the transmission order.

* * * * *